United States Patent
Kang et al.

(10) Patent No.: US 6,891,547 B2
(45) Date of Patent: May 10, 2005

(54) MULTIMEDIA DATA DECODING APPARATUS AND METHOD CAPABLE OF VARYING CAPACITY OF BUFFERS THEREIN

(75) Inventors: Sang-ug Kang, Anyang (KR); Moon-seok Han, Guri (KR); Austin Lobo, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 264 days.

(21) Appl. No.: 10/196,248

(22) Filed: Jul. 17, 2002

(65) Prior Publication Data

US 2003/0072563 A1 Apr. 17, 2003

(30) Foreign Application Priority Data

Oct. 16, 2001 (KR) .................................... 2001-0063693

(51) Int. Cl.[7] ................................................ G06T 9/00
(52) U.S. Cl. ........................ 345/555; 345/546; 382/232; 382/233
(58) Field of Search ................................ 345/555, 556, 345/536, 546, 558, 560; 382/232, 233, 235; 710/1–3, 65, 68; 709/104, 217

(56) References Cited

U.S. PATENT DOCUMENTS

| | | | | |
|---|---|---|---|---|
| 6,141,385 A | * | 10/2000 | Yamaji | 375/240.27 |
| 6,252,907 B1 | * | 6/2001 | Hwang | 375/240.25 |
| 6,631,403 B1 | * | 10/2003 | Deutsch et al. | 709/217 |
| 2002/0024539 A1 | * | 2/2002 | Eleftheriadis et al. | 345/765 |
| 2002/0170062 A1 | * | 11/2002 | Chen et al. | 725/86 |

* cited by examiner

Primary Examiner—Matthew C. Bella
Assistant Examiner—Mackly Monestime
(74) Attorney, Agent, or Firm—Staas & Halsey LLP

(57) ABSTRACT

A multimedia data decoding apparatus to decode multimedia data and method thereof includes a data information extracting unit extracting detail information from the multimedia data. An input buffering unit stores the multimedia data for a predetermined time. A decoding unit decodes the multimedia data from the input buffering unit into original signals of respective types. An output buffering unit stores the decoded multimedia data for a predetermined time. A control unit determines buffering capacities of the input buffering unit and the output buffering unit based on the detail information extracted by the data information extracting unit.

28 Claims, 6 Drawing Sheets

MULTIMEDIA DATA DECODING APPARATUS AND METHOD CAPABLE OF VARYING CAPACITY OF BUFFERS THEREIN

CROSS-REFERENCE TO RELATED APPLICATIONS

This application claims the benefit of Korean Application No. 2001-63693, filed Oct. 16, 2001, in the Korean Patent Office, the disclosure of which is incorporated herein by reference.

BACKGROUND OF THE INVENTION

1. Field of the Invention

The present invention relates to a multimedia data decoding apparatus and method, and more particularly, to a multimedia data decoding apparatus and method managing a memory buffer that temporarily stores multimedia data to decode the multimedia data in an MPEG-4 format.

2. Description of the Related Art

The Moving Picture Expert Group (MPEG) is a name of a family of standards used for compressing and decompressing motion pictures (established in 1988). Unlike Joint Photographic Experts Group (JPEG) that defines a compression of a still picture, the MPEG defines the standards used for compressing and coding a multimedia data, like audio/video data, that continuously varies over time, for a purpose of data transmission.

Presently, MPEG-1, MPEG-2, MPEG-3 and MPEG-4 are available as the MPEG. The MPEG-1 provides digital recording media like CD-ROM, with image and sound quality like that of a Video Cassette Recorder (VCR). The MPEG-2 is an improvement from the MPEG-1 in terms of an audio/video compressing efficiency that provides the image and sound quality of the high resolution digital video apparatus, such as digital TVs, interactive TVs, DVDs. The MPEG-3 is a further improvement from the MPEG-2,. The MPEG-3 is an improved video compression technology, which is aimed to obtain a same high-resolution picture as that of HDTV. As MPEG-3 is now part of the MPEG-2, there is officially no MPEG-3 in the MPEG. The MPEG-4 is a video compression technology developed for a next generation bi-directional multimedia communication such as the Internet, digital TV, DVD, mobile communications. The MPEG-4 is the standard to code the multimedia data for all types of broadcasting, the Internet, movies, mobile communications, and games, and provides transmission functions like interactivity of a computer and transmission of communication altogether.

Figure 1:
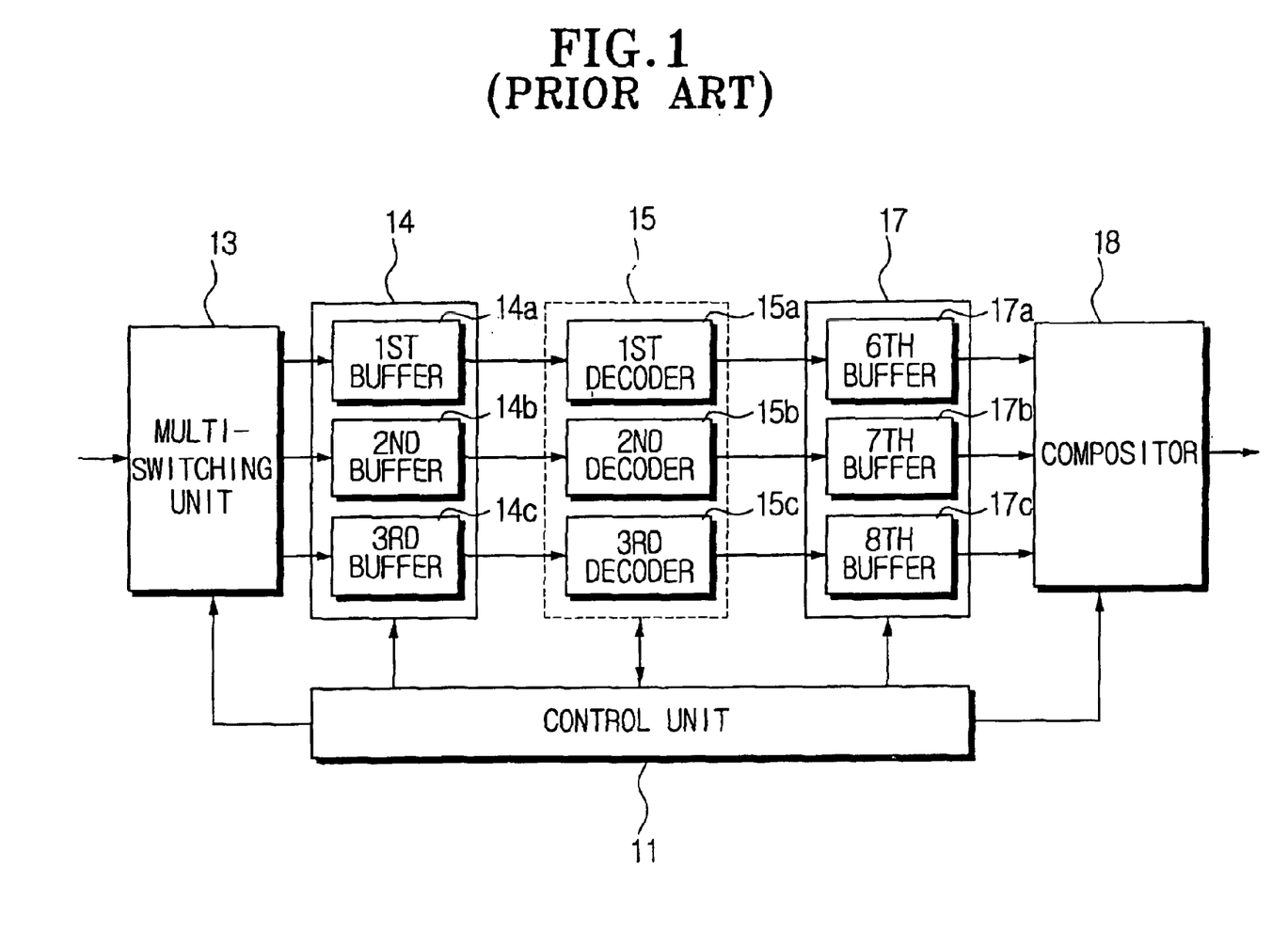
FIG. 1 is a block diagram showing a conventional multimedia data decoding apparatus.

FIG. 1 is a block diagram schematically showing a conventional multimedia data decoding apparatus applied to MPEG-4. As shown in FIG. 1, the conventional multimedia decoding apparatus includes a multi-switching unit 13 that divides data from received multimedia data according to respective types of data, an input buffering unit 14 that stores the multimedia data output from the multi-switching unit 13 for a predetermined time, and a decoding unit 15 that decodes the multimedia data output from the input buffering unit 14 into an original signal. The conventional multimedia decoding apparatus further includes an output buffering unit 17 that stores the multimedia data output decoded by the decoding unit 15 for a predetermined time, and a compositor 18 that calculates a display position of the decoded multimedia data output from the output buffering unit 17 on a screen. The conventional multimedia data decoding apparatus has a control unit 11 that controls the operation of the multi-switching unit 13, the input buffering unit 14, the decoding unit 15, the output buffering unit 17, and the compositor 18, and sets sizes of buffers 14a, 14b, 14c, 17a, 17b, 17c of the input buffering unit 14 and the output buffering unit 17, respectively.

The conventional multimedia data decoding apparatus receives continuous streams of multimedia data, which are rich media, and performs decoding and outputting. When the multimedia data is input to the buffers 14a, 14b, 14c of the input buffering unit 14, decoders 15a, 15b, 15c of the decoding unit 15 decode the data into the original signal. The buffers 17a, 17b, 17c of the output buffering unit 17 store the decoded data, and output the data to the compositor 18 according to the command from the control unit 11.

The input buffering unit 14 and the output buffering unit 17 of the multimedia data decoding apparatus are, however, set to have a predetermined capacity regardless of amounts of streams of different types of multimedia data. Accordingly, the control unit 11 has to control the buffering operation of the input buffering unit 14 and the output buffering unit 17 in consideration of the amounts of multimedia data streams.

However, if a proper number of buffers of proper amounts are employed in the multimedia data decoding apparatus to solve the above-mentioned problem, another problem of capacity waste arises when the data is received in different amounts. Another problem of increased product costs to produce the multimedia data decoding apparatus with sufficient buffers with sufficient capacity also exists.

SUMMARY OF THE INVENTION

The present invention has been made to overcome the above-mentioned problems of the prior art. Accordingly, the present invention provides a multimedia data decoding apparatus and a method thereof capable of optimizing a buffer that stores a real time transmission of rich media on a temporary basis, thereby decoding the multimedia data efficiently.

To achieve the above and other objects, the present invention may be accomplished by providing a multimedia data decoding apparatus to decode multimedia data, including: a data information extracting unit extracting detail information from the multimedia data; an input buffering unit storing the multimedia data for a first predetermined time; a decoding unit decoding the multimedia data from the input buffering unit into original signals of respective types; an output buffering unit storing the decoded multimedia data for a second predetermined time; and a control unit determining buffering capacities of the input buffering unit and the output buffering unit based on the detail information extracted by the data information extracting unit.

The multimedia data decoding apparatus further includes a multi-switching unit dividing the multimedia data to respective types of media data and providing the respective types of media data to the input buffering unit. The respective types of media data include at least one of audio data, video data, text data and graphic data. The detail information includes at least one of a synchronous layer configuration descriptor, an elementary streams descriptor, and a decoder configuration descriptor of the multimedia data.

The multimedia data decoding apparatus further includes a compositor setting a display location of the decoded multimedia data from the output buffering unit on a screen.

To achieve the above and other objects, the present invention may be accomplished by providing a multimedia data decoding method to decode multimedia data, including: extracting detail information from multimedia data; storing the multimedia data for a first predetermined time in an input buffering unit; decoding the multimedia data from the input buffering unit into original signals of respective media data types; storing the decoded multimedia data in an output buffering unit for a second predetermined time; determining buffering capacities of the input buffering unit and the output buffering unit based on the detailed information; and setting the buffering capacities of the input buffering unit and the output buffering unit based on the determined buffering capacities.

The method further includes dividing the multimedia data to respective types of media data; and providing the respective types of media data to the input buffering unit. The respective types of media data include at least one of audio data, video data, text data and graphic data. The detail information includes at least one of a synchronous layer configuration descriptor, an elementary streams descriptor, and a decoder configuration descriptor of the multimedia data. The multimedia data decoding method further includes setting a display location of the decoded multimedia data from the output buffering unit on a screen.

According to an embodiment of the present invention, the detail information of the received multimedia data, i.e., a Synchronous Layer Configuration Descriptor (SLCD), an Elementary Streams Descriptor (ESD), and a Decoder Configuration descriptor (DCD) can be extracted. Then, based on the extracted detail information, the control unit can variably determine and set the buffering capacities of the respective buffers of the input buffering unit and the output buffering unit. Accordingly, buffering management of the respective buffers is carried out efficiently.

To achieve the above and other objects, the present invention may be accomplished by providing a multimedia data decoding method to decode multimedia data, including: storing the multimedia data in an input buffering unit; decoding the multimedia data from the input buffering unit into original signals of respective media data types; storing the decoded multimedia data in an output buffering unit; determining buffering capacities of the input buffering unit and the output buffering unit; and setting the buffering capacities of the input buffering unit and the output buffering unit based on the determined buffering capacities, wherein the buffering capacities of the input and output buffering units are determined after the decoding of the multimedia data to respective media data types, determining a memory size average of the input and output buffering units, and determining a TD value, which is an allowance time for media data input and output delays, to efficiently perform buffer management.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like refer ence symbols indicate the same or similar components, wherein.

DETAILED DESCRIPTION OF THE PREFERRED EMBODIMENTS

An embodiment of the present invention will be described below with reference to the accompanying drawings.

Figure 2:
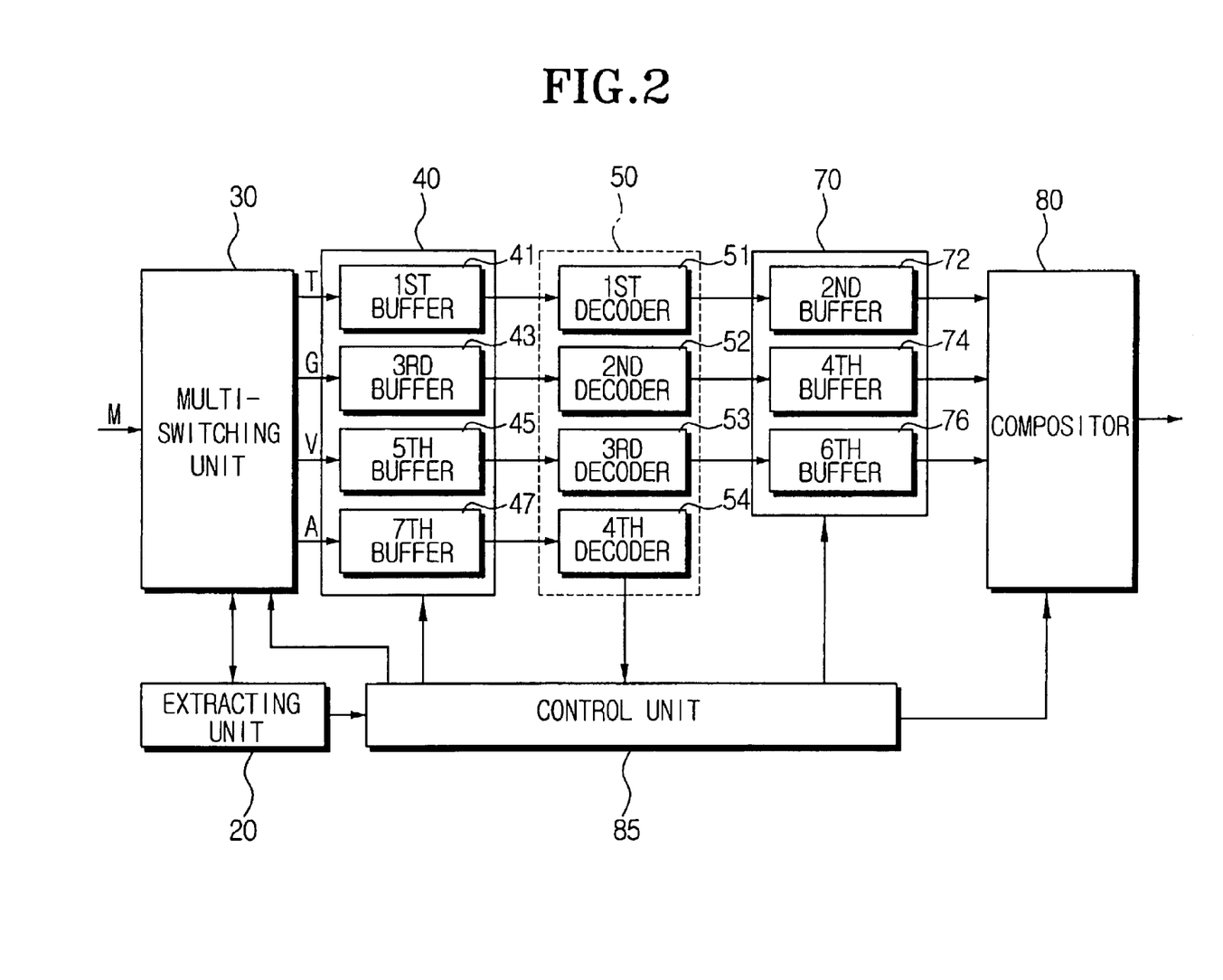
FIG. 2 is a block diagram showing a multimedia data decoding apparatus according to an embodiment of the present invention.

FIG. 2 is a block diagram showing a multimedia data decoding apparatus to vary a capacity of a buffer that stores received multimedia data (M) according to an embodiment of the present invention. As shown in FIG. 2, the multimedia data decoding apparatus includes a multi-switching unit 30, a data information extracting unit 20, a control unit 85, an input buffering unit 40, a decoding unit 50, an output buffering unit 70, and a compositor 80. The multimedia data is divided according to respective types of media data, such as audio data (A), video data (V), graphic data (G), and text data (T).

The multimedia decoding apparatus performs an appropriate output operation according to each type of the received multimedia data (M). Specifically, the multi-switching unit 30 divides the received multimedia data (M) into respective types of media data, and outputs the divided data to the input buffering unit 40 according to an output command from the control unit 85.

The data information extracting unit 20 extracts detail information from the respective types of media data from the received multimedia data (M) input to the multi-switching unit 30. The detail information contains a Synchronous Layer Configuration Descriptor (SLCD), an Elementary Streams Descriptor (ESD), and a Decoder Configuration descriptor (DCD). The control unit 85 analyzes the detail information extracted by the data information extracting unit 20 and determines buffering capacities of the input buffering unit 40 and the output buffering unit 70.

The input buffering unit 40 stores the respective types of media data in the multimedia data (M) from the multi-switching unit 30 for a first predetermined time, and outputs the respective types of media data to the decoding unit 50 according to an output command signal from the control unit 85. The input buffering unit 40 has a first buffer 41, a third buffer 43, a fifth buffer 45, and a seventh buffer 47. As shown in FIG. 2, the first buffer 41 stores and outputs the text data (T), and the third buffer 43 stores and outputs the graphic data (G). The fifth buffer 45 stores and outputs the video data (V), and the seventh buffer 47 stores and outputs the audio data (A).

The decoding unit 50 performs decoding of the media data of respective types. The decoding unit 50 has a first decoder 51, a second decoder 52, a third decoder 53 and a fourth decoder 54. The first decoder 51 performs the decoding of the text data (T) and the second decoder 52 performs the decoding of the graphic data (G). The third decoder 53 performs the decoding of the video data (V) and the fourth decoder 54 performs the decoding of the audio data (A).

Meanwhile, the fourth decoder 54 decodes the audio data (A) and transmits the same to the control unit 85. While the audio data (A), input from the fourth decoder 54, is output through a speaker, the control unit 85 controls the compositor 80 so that a mark image is indicated on the compositor 80 corresponding to the audio output.

The output buffering unit 70 stores the media data of respective types, which is decoded through the decoding unit 50, for a second predetermined time, and outputs to the compositor 80 according to the output command from the control unit 85. The output buffering unit 70 has a second buffer 72, a fourth buffer 74, and a sixth buffer 76. The second buffer 72 stores and outputs the text data (T), the fourth buffer 74 stores and outputs the graphic data (G), and the sixth buffer 76 stores and outputs the video data (V) as decoded media data.

The control unit 85 analyzes the detail information of the respective types of media data in the multimedia data (M) extracted by the data information extracting unit 20, thereby determining the buffering capacities of the respective buffers 41, 43, 45, 47, 72, 74, 76 of the input buffering unit 40 and the output buffering unit 70. The control unit 85, for instance, may determine that the buffers 72, 74, 76 of the output buffering unit 70 have same buffering capacities as that of the corresponding buffers 41, 43, 45 of the input buffering unit 40. Accordingly, the control unit 85 sets the buffering capacity for each of the buffers 41, 43, 45, 47, 72, 74, 76 as determined.

When the text data (T), the graphic data (G) and the video data (V), output from the output buffering unit 70 are displayed on the screen, the compositor 80 sets a display position of the data. The compositor 80 may set the display position according to an output synchronization signal determined by the control unit 85 of each media data.

The control unit 85 analyzes the detail information of the respective types of media data that are downloaded in a continuous streaming. Thus, the multimedia data decoding apparatus applied to the MPEG-4, according to an embodiment of the present invention, variably sets the buffering capacities of the input buffer 40 and the output buffer 70 according to the detail information from the control unit 85, thereby minimizing possible damage by the decoding of the multimedia data (M).

The detail information, extracted by the data information extracting unit 20 from the respective types of media data in the multimedia data (M) input through the multi-switching unit 30, includes a Sync Layer Configuration Descriptor (SLCD), an Elementary Streams Descriptor (ESD) and a Decoder Configuration descriptor (DCD). Accordingly, the control unit 85 analyzes the SLCD, ESD, and DCD of the respective types of media data in the multimedia data (M) provided by the data information extracting unit 20 and, thereby determines the buffering capacity of each of the buffers 41, 43, 45, 47, 72, 74, 76. Such determination of the buffering capacities by the control unit 85 is performed when the detail information of the respective types of media data in the multimedia data (M) is received.

According to the type of the multimedia data (M), which is determined through an analysis of the detail information, the control unit 85 determines whether each buffer 41, 43, 45, 47, 72, 74, 76 of the input buffering unit 40 and the output buffering unit 70 are an Instant Memory (IM) type or a Persistent Memory (PM) type. The IM is generated only when there is multimedia data to be stored. Examples of the multimedia data of IM application are the text data (T) and the graphic data (G), which are non-real, time streaming type. The PM exists as long as there is no elimination command from the control unit 85. In other words, even when there is no data to be stored, the PM exists. Examples of the media data, which can be stored in such a buffer, are the audio data A and the video data (V), which are real time streaming, type data. Accordingly, the control unit 85 may determine the type of each buffer before determining the buffering capacities of the buffering units 40 and 70.

According to a characteristic of each type of the multimedia data (M) analyzed through the detail information of the multimedia data (M), the control unit 85 sets a Time Delay (TD) value, which is an allowance time for media data input and output delays. The control unit 85 may set the TD value respectively to a long TD that is longer than a predetermined reference time, a mid TD that equals the reference time, and a short TD that is shorter than the reference time.

If the respective types of media data in the multimedia data (M) equal the graphic data (G) and the text data (T), which are still pictures, the TD value may be set to be the long TD value. If the respective types of media data in the multimedia data (M) are the motion picture, i.e., video data (V), the TD value may be the mid TD value. If the multimedia data (M) is the audio data (A) like sounds, the TD value may be the short TD value.

As described, the control unit 85 variably determines and sets the type, storage capacity, and TD values of the respective buffers 41, 43, 45, 47, 72, 74, 76 based on the detail information of the media data, thereby increasing a utilization of the buffer 40, 70 which has a limited capacity.

Accordingly, a storage occupation increase due to the presence of the respective types of media data in the multimedia data (M) that is not output but stored in the buffers 41, 43, 45, 47, 72, 74, 76 can be prevented, while a loss of the multimedia data (M), which is caused as the media data is stored in the buffers 41, 43, 45, 47, 72, 74, 76 overtime, can be minimized.

Figure 3:
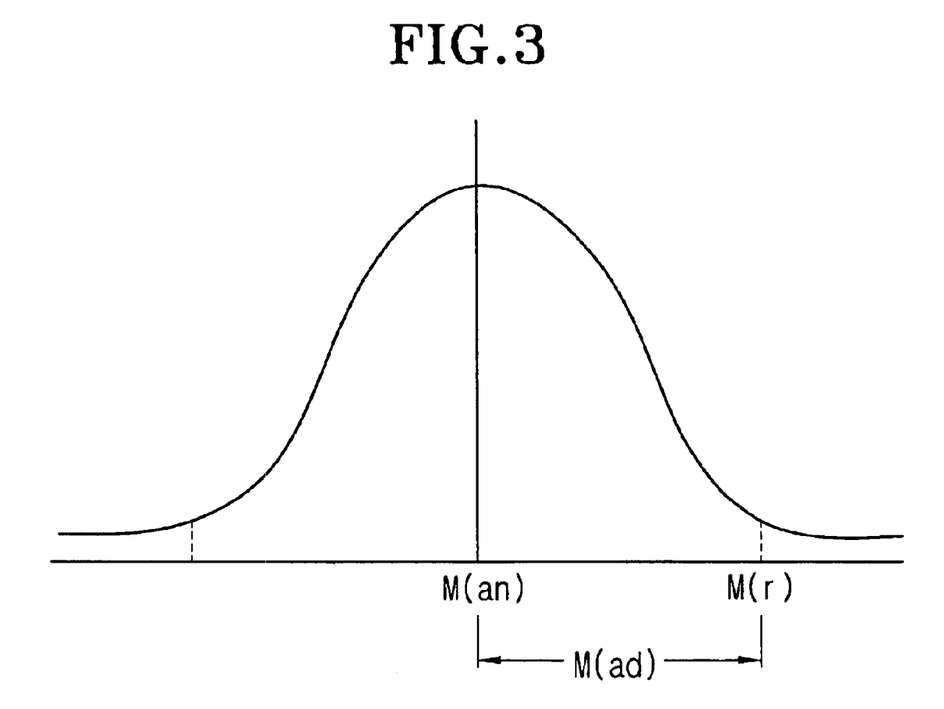
FIG. 3 is a graph showing a curve of Gaussian distribution that is used to determine buffering capacities of an input buffering unit and an output buffering unit of FIG. 2.

FIG. 3 is a graph showing a curve of a Gaussian distribution used to determine the buffering capacities of the input buffering unit 40 and the output buffering unit 70 of FIG. 2. A method of calculating the buffering capacities of the respective buffers 41, 43, 45, 47, 72, 74, 76 will be described below.

'Memory size average M(a)' denotes the buffering capacities of the respective buffers 41, 43, 45, 47, 72, 74, 76 set in consideration of an average bit rate occurring for one second in one transmission channel of the multimedia data (M). Based on the presumption that the buffering capacities of the respective buffers 41, 43, 45, 47, 72, 74, 76 have the Gaussian distribution with the average of the M(a), the buffering capacities of the respective buffers 41, 43, 45, 47, 72, 74, 76 can be calculated by a following Equation 1:

$$M(r) = M(an) + M(ad)$$

M(r) is actual buffering capacities of the buffering units 40 and 70, M(an) is the buffering capacities of the buffering units 40 and 70 obtained with the TD value with respect to the M(a) being taken into account, and M(ad) is an additional buffering capacity obtained with a discrete degree of M(an) of the Gaussian distribution function being into account.

As described above, the buffering capacities M(r) of the respective buffers 41, 43, 45, 47, 72, 74, 76 may be calculated with the buffering capacity 'M(an)' that takes the TD value into account, and the additional buffering capacity 'M(ad)' of M(an) that takes the discrete degree M(an) through the Gaussian distribution function into account.

The multimedia data decoding apparatus, according to an embodiment of the present invention, is capable of variably setting and effectively controlling the buffering capacities of the respective buffers 41, 43, 45, 47, 72, 74, 76 of limited capacity, through the statistics and analysis of the buffering capacities calculated by a bit rate of the received multimedia data (M).

Figure 4:
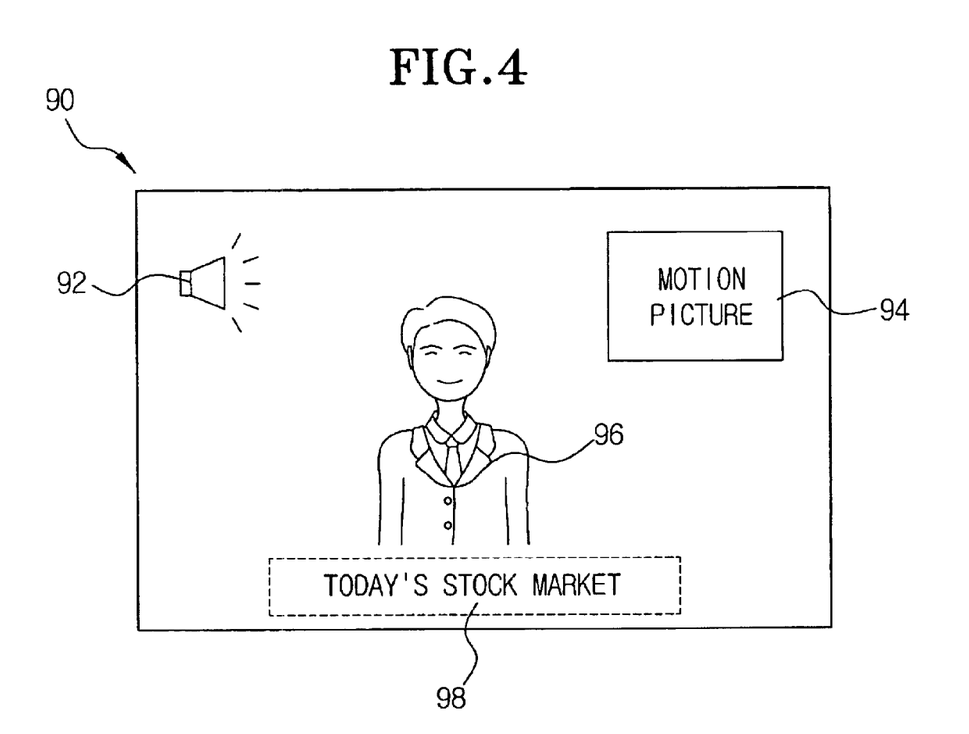
FIG. 4 is a view showing the multimedia data of FIG. 2 displayed on a screen.

FIG. 4 is a view showing the received multimedia data (M) being displayed on a screen 90 as the multimedia data (M) is decoded and output. Displayed on the screen 90 are stock market information 98 corresponding to the text data (T), graphic information 96 corresponding to the graphic data (G), motion information 94 corresponding to the video data (V), and audio information 92 indicating an output status of the audio data (A).

The multimedia decoding apparatus, according an embodiment of the present invention, provides a function of editing each of the multimedia data (M) 92, 94, 96, 98 as a separate item. For instance, if a user does not want to see a certain portion of a person's image of the graphic information 96, the user may select the certain portion so that the multimedia decoding apparatus does not display the selected portion.

As below, the multimedia data decoding method carried out by the multimedia data decoding apparatus, according to the present invention, will be described with reference to a flowchart of FIG. 5. Throughout the description, a description that would be overlapped with what have been described above with reference to FIGS. 2 through 4 will be omitted.

At operation S10, when the multimedia data (M) is input to the multi-switching unit 30, the data information extracting unit 20 extracts the detail information from the multimedia data (M), and transmits the extracted data to the control unit 85. At operation S30, the control unit 85 analyzes the detail information of the multimedia data (M) and determines the buffering capacities of the respective buffers 41, 43, 45, 47, 72, 74, 76. The detail information includes the Sync Layer Configuration Descriptor (SLCD), the Elementary Streams Descriptor (ESD), and the Decoder Configuration Descriptor (DCD).

At operation S50, the control unit 85 sets the buffering capacities of the respective buffers 41, 43, 45, 47, 72, 74, 76 according to the determined buffering capacities. Accordingly, at operation S70, the respective buffers 41, 43, 45, 47, 72, 74, 76 store and output the multimedia data (M) being input according to the control signal from the control unit 85. By variably setting the buffering capacities allotted to the respective buffers 41, 43, 45, 47, 72, 74, 76, a loss due to the reproduction of the received multimedia data (M) can be prevented.

Figure 5:
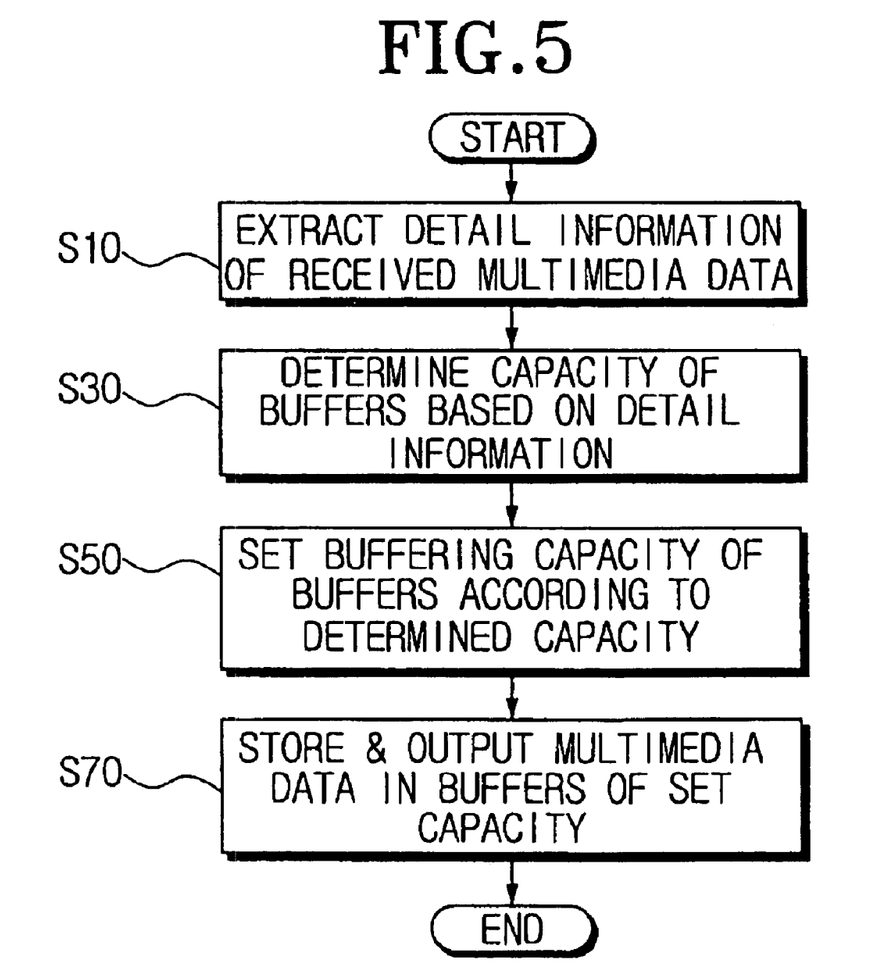
FIG. 5 is a flowchart showing a multimedia data decoding method performed by the multimedia data decoding apparatus of FIG. 2.
Figure 6:
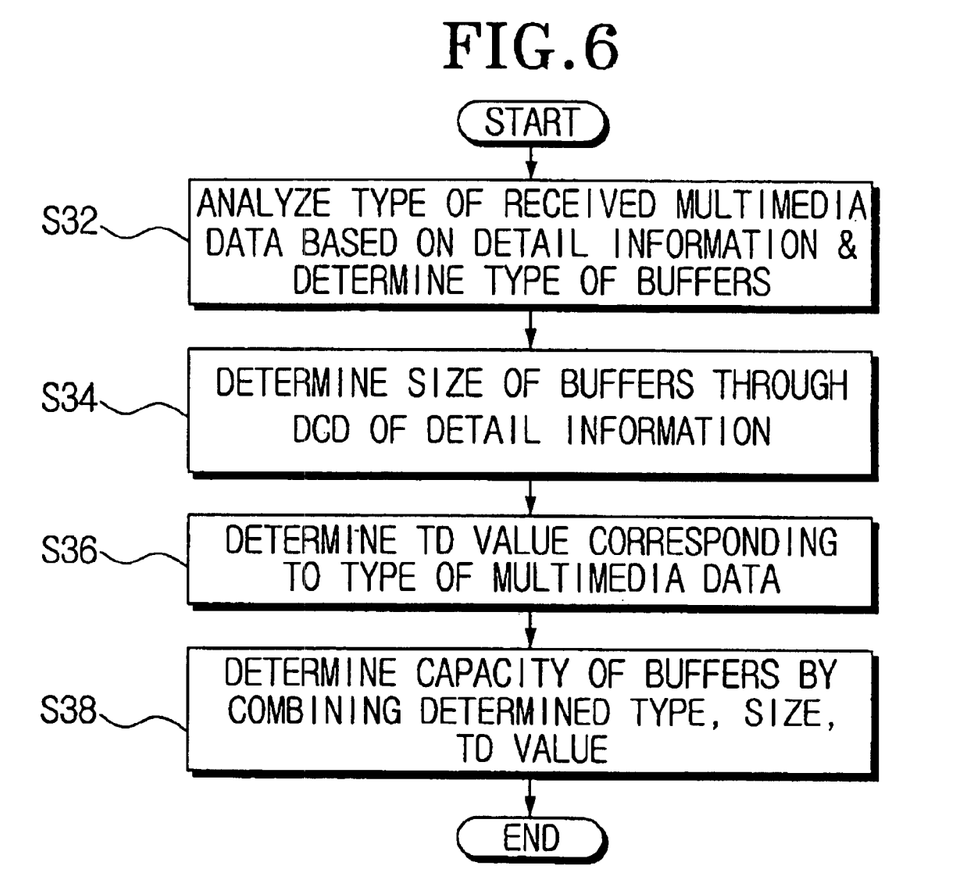
FIG. 6 is a flowchart showing buffering capacities determination of FIG. 5.

FIG. 6 is a flowchart showing in detail determining the buffering capacities of the respective buffers 41, 43, 45, 47, 72, 74, 76 of FIG. 5.

At operation S32, the control unit 85 analyzes the respective types of media data in the multimedia data (M) based on the detail information of the multimedia data (M), and determines the types of the respective buffers 41, 43, 45, 47, 72, 74, 76. And, at operation S34, the control unit 85 determines the capacities of the respective buffers 41, 43, 45, 47, 72, 74, 76 based on one of the detail information of the multimedia data (M), i.e., based on the DCD of the multimedia data (M). At operation S36, the control unit 85 also determines the TD values of the multimedia data (M) of the types of the respective buffers 41, 43, 45, 47, 72, 74, 76 based on the detail information of the multimedia data (M). Accordingly, at operation S38, the control unit 85 determines the buffering capacities of the respective buffers 41, 43, 45, 47, 72, 74, 76 through the combination of the respective media data type, the capacities, and TD values of the respective buffers 41, 43, 45, 47, 72, 74, 76. By determining and setting the final buffering capacities of the buffers 41, 43, 45, 47, 72, 74, 76 after determining the type, size, and TD value of the respective buffers 41, 43, 45, 47, 72, 74, 76, buffer management is performed efficiently.

According to the present invention, the detail information of the received multimedia data, i.e., the SLCD, ESD, and DCD can be extracted. Then, based on the extracted detail information, the control unit 85 can variably determine and set the buffering capacities of the respective buffers 41, 43, 45, 47, 72, 74, 76 of the input buffering unit 40 and the output buffering unit 70. Accordingly, buffering management of the respective buffers 41, 43, 45, 47, 72, 74, 76 is carried out efficiently.

Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. A multimedia data decoding apparatus to decode multimedia data, comprising:
   a data information extracting unit extracting detail information from the multimedia data;
   an input buffering unit storing the multimedia data for a first predetermined time;
   a decoding unit decoding the multimedia data from the input buffering unit into original signals of respective types;
   an output buffering unit storing the decoded multimedia data for a second predetermined time; and
   a control unit determining buffering capacities of the input buffering unit and the output buffering unit based on the detail information extracted by the data information extracting unit.

2. The multimedia data decoding apparatus of claim 1, further comprising a multi-switching unit dividing the multimedia data to respective types of media data and providing the respective types of media data to the input buffering unit.

3. The multimedia data decoding apparatus of claim 2, wherein the respective types of media data comprise at least one of audio data, video data, text data and graphic data.

4. The multimedia data decoding apparatus of claim 1, wherein the detail information comprises at least one of a synchronous layer configuration descriptor, an elementary streams descriptor, and a decoder configuration descriptor of the multimedia data.

5. The multimedia data decoding apparatus of claim 1, further comprising a compositor setting a display location of the decoded multimedia data from the output buffering unit on a screen.

6. The multimedia data decoding apparatus of claim 5, wherein the compositor selectively displays graphic information from the decoded multimedia data on the screen.

7. The multimedia data decoding apparatus of claim 1, wherein the control unit varies the capacities of the input buffering unit and the output buffering unit based on the detail information.

8. The multimedia data decoding apparatus of claim 1, wherein the input buffering unit comprises a first buffer storing text data, a third buffer storing graphic data, a fifth buffer storing video data, and a seventh buffer storing audio data, where the text data, the graphic data, the video data, and the audio data are output to the decoding unit.

9. The multimedia data decoding apparatus of claim 8, wherein the decoding unit comprises a first decoder decoding the text data, a second decoder decoding the graphic data, a third decoder decoding the video data, and a fourth decoder decoding the audio data.

10. The multimedia data decoding apparatus of claim 9, further comprising a compositor, wherein the audio data is transmitted to the control unit to control the compositor so that a mark image is indicated on the compositor corresponding to the audio data.

11. The multimedia data decoding apparatus of claim 10, wherein the compositor sets the display position according to an output synchronization signal determined by the control unit, of the text data, the graphic data, the video data, and the audio data.

12. The multimedia data decoding apparatus of claim 11, wherein according to a characteristic of each media type of the multimedia data analyzed through the detail information, the control unit sets a Time Delay (TD) value, which is an allowance time for media data input and output delays, respectively, to a long TD value that is longer than a third predetermined time, a mid TD value that equals the third predetermined time, and a short TD value that is shorter than the third predetermined time.

13. The multimedia data decoding apparatus of claim 12, wherein the TD value is set to the long TD value when the media type of the multimedia data comprises graphic data and text data.

14. The multimedia data decoding apparatus of claim 12, wherein the TD value is set to the mid TD value when the media type of the multimedia data comprises video data.

15. The multimedia data decoding apparatus of claim 12, wherein the TD value is set to the short TD value when the media type of the multimedia data comprises audio data.

16. The multimedia data decoding apparatus of claim 12, wherein the buffering capacities of the input and output buffering units is determined using a Gaussian distribution comprising $$M(r)=M(an)+M(ad)$$

where M(r) is actual buffering capacities of the buffering units, M(an) is the buffering capacities of the input and output buffering units obtained with the TD value with respect to a memory size average of the input and output buffering units, and M(ad) is an additional buffering capacity obtained with a discrete degree of the M(an).

17. The multimedia data decoding apparatus of claim 12, wherein the multimedia data comprises a real time transmission of rich media.

18. The multimedia data decoding apparatus of claim 1, wherein the detail information comprises a Sync Layer Configuration Descriptor (SLCD), an Elementary Streams Descriptor (ESD) and a Decoder Configuration descriptor (DCD).

19. The multimedia data decoding apparatus of claim 1, wherein the input buffering unit and the output buffering unit each comprises an Instant Memory (IM) type or a Persistent Memory (PM) type.

20. The multimedia data decoding apparatus of claim 12, wherein the TD value is set to the long TD value when the media type of the multimedia data comprises graphic data and text data, the TD value is set to the mid TD value when the media type of the multimedia data comprises video data, and the TD value is set to the short TD value when the media type of the multimedia data comprises audio data.

21. A multimedia data decoding method to decode multimedia data, comprising:
   extracting detail information from multimedia data;
   storing the multimedia data for a first predetermined time in an input buffering unit;
   decoding the multimedia data from the input buffering unit into original signals of respective media data types;
   storing the decoded multimedia data in an output buffering unit for a second predetermined time;
   determining buffering capacities of the input buffering unit and the output buffering unit based on the detailed information; and
   setting the buffering capacities of the input buffering unit and the output buffering unit based on the determined buffering capacities.

22. The multimedia data decoding method of claim 21, further comprising:
   dividing the multimedia data to respective types of media data; and
   providing the respective types of media data to the input buffering unit.

23. The multimedia data decoding method of claim 22, wherein the respective types of media data comprise at least one of audio data, video data, text data and graphic data.

24. The multimedia data decoding method of claim 21, wherein the detail information comprises at least one of a synchronous layer configuration descriptor, an elementary streams descriptor, and a decoder configuration descriptor of the multimedia data.

25. The multimedia data decoding method of claim 21, further comprising:
   setting a display location of the decoded multimedia data from the output buffering unit on a screen.

26. The multimedia data decoding method of claim 21, wherein the determining of the buffering capacities of the input and output buffering units comprises
   analyzing the respective types of media data based on the detail information of the multimedia data,
   determining Time Delay (TD) values of the respective types of media data of the input and output buffering units based on the detail information of the multimedia data, and
   determining the buffering capacities of the input and output buffering units based on a combination of the respective types of media data and TD values of the input and output buffering units.

27. The multimedia data decoding method of claim 21, wherein the multimedia data comprises a real time transmission of rich media.

28. A multimedia data decoding method to decode multimedia data, comprising:
   storing the multimedia data in an input buffering unit;
   decoding the multimedia data from the input buffering unit into original signals of respective media data types;
   storing the decoded multimedia data in an output buffering unit;
   determining buffering capacities of the input buffering unit and the output buffering unit; and setting the buffering capacities of the input buffering unit and the output buffering unit based on the determined buffering capacities, wherein the buffering capacities of the input and output buffering units are determined after the decoding of the multimedia data to respective media data types, determining a memory size average of the input and output buffering units, and determining a TD value, which is an allowance time for media data input and output delays, to efficiently perform buffer management.

* * * * *